United States Patent
Yiu et al.

(10) Patent No.: US 12,022,398 B2
(45) Date of Patent: Jun. 25, 2024

(54) TECHNIQUES TO REDUCE RADIO RESOURCE MANAGEMENT MEASUREMENTS AND USER EQUIPMENT POWER CONSUMPTION

(71) Applicant: Apple Inc., Cupertino, CA (US)

(72) Inventors: Candy Yiu, Portland, OR (US); Marta Martinez Tarradell, Hillsboro, OR (US); Jie Cui, Santa Clara, CA (US); Hong He, Sunnyvale, CA (US); Kyeongin Jeong, Portland, OR (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 17/279,901

(22) PCT Filed: Sep. 26, 2019

(86) PCT No.: PCT/US2019/053193
§ 371 (c)(1),
(2) Date: Mar. 25, 2021

(87) PCT Pub. No.: WO2020/069155
PCT Pub. Date: Apr. 2, 2020

(65) Prior Publication Data
US 2021/0400589 A1     Dec. 23, 2021

Related U.S. Application Data

(60) Provisional application No. 62/739,078, filed on Sep. 28, 2018.

(51) Int. Cl.
*H04W 24/10*     (2009.01)
*H04W 52/02*     (2009.01)

(52) U.S. Cl.
CPC ....... *H04W 52/0254* (2013.01); *H04W 24/10* (2013.01)

(58) Field of Classification Search
CPC ...... H04B 17/309; H04B 7/0413; H04B 7/06; H04W 24/10; H04W 52/0254;
(Continued)

(56) References Cited

U.S. PATENT DOCUMENTS 8,380,206 B1    2/2013 Laitinen et al.
9,474,000 B2 *  10/2016 Kilpatrick, II ............................. H04W 36/008375

(Continued)

FOREIGN PATENT DOCUMENTS

CN    105027636 A    11/2015
CN    106165491 A    11/2016
(Continued)

OTHER PUBLICATIONS

International Search Report and Written Opinion of the International Searching Authority directed to related International Patent Application No. PCT/US2019/053193, dated Mar. 25, 2020, 10 pages.
(Continued)

*Primary Examiner* — Nathan S Taylor
(74) *Attorney, Agent, or Firm* — Sterne, Kessler, Goldstein & Fox P.L.L.C.

(57) ABSTRACT

Embodiments of the present disclosure provide techniques for reducing radio resource management (RRM) measurements and user equipment (UE) power consumption in a wireless cellular network. Other embodiments may be described and claimed.

19 Claims, 9 Drawing Sheets

300

Receiving, from a UE, an indication that a mobility of the UE is low or very high
304

Adjusting one or more parameters for the UE based on the indication
308

(58) Field of Classification Search
CPC ............. H04W 36/0088; H04W 36/32; H04W 52/0251; H04W 8/24; H04W 52/02
See application file for complete search history.

(56) References Cited

U.S. PATENT DOCUMENTS

| | | | |
|---|---|---|---|
| 9,485,771 B2* | 11/2016 | Kilpatrick, II | .... H04W 72/0473 |
| 9,706,424 B2 | 7/2017 | Jung et al. | |
| 2010/0239034 A1 | 9/2010 | Lee et al. | |
| 2013/0188503 A1 | 7/2013 | Anepu et al. | |
| 2014/0003259 A1* | 1/2014 | Chin | ................ H04W 52/0245 370/252 |
| 2014/0038615 A1 | 2/2014 | Kazmi | |
| 2014/0200002 A1 | 7/2014 | Vangala et al. | |
| 2014/0226541 A1* | 8/2014 | Xu | .................... H04W 72/0446 370/336 |
| 2015/0036598 A1* | 2/2015 | Kilpatrick, II | ........ H04W 36/04 370/329 |
| 2015/0038156 A1* | 2/2015 | Kilpatrick, II | ...... H04W 52/325 455/561 |
| 2015/0215830 A1* | 7/2015 | Dalsgaard | ......... H04W 36/0088 455/444 |
| 2015/0312826 A1 | 10/2015 | Yiu et al. | |
| 2015/0373626 A1* | 12/2015 | Yi | ........................ H04B 1/7143 375/132 |
| 2016/0014628 A1* | 1/2016 | Kim | ..................... H04W 48/16 370/329 |
| 2016/0072572 A1 | 3/2016 | Kang et al. | |
| 2016/0338118 A1* | 11/2016 | Vajapeyam | ........... H04L 69/323 |
| 2016/0373994 A1* | 12/2016 | Yiu | ................... H04W 52/0206 |
| 2017/0026861 A1* | 1/2017 | Tseng | ..................... H04W 24/08 |
| 2017/0055174 A1 | 2/2017 | Siomina et al. | |
| 2017/0127397 A1 | 5/2017 | Hahn et al. | |
| 2017/0208516 A1 | 7/2017 | Kubota et al. | |
| 2017/0251417 A1* | 8/2017 | Lin | ....................... H04W 36/36 |
| 2017/0353989 A1* | 12/2017 | Kim | .................. H04W 36/0022 |
| 2018/0132125 A1 | 5/2018 | Li et al. | |
| 2018/0324678 A1* | 11/2018 | Chen | ....................... H04W 8/08 |
| 2019/0059105 A1* | 2/2019 | Harada | ................. H04W 16/14 |
| 2019/0306915 A1* | 10/2019 | Jin | ........................ H04W 76/28 |
| 2019/0342907 A1* | 11/2019 | Huang | .................. H04W 72/23 |
| 2019/0394802 A1* | 12/2019 | Karaki | .................. H04W 16/14 |
| 2020/0029315 A1* | 1/2020 | Lin | ........................ H04L 1/0075 |
| 2020/0120552 A1* | 4/2020 | Yang | .................. H04W 36/0069 |
| 2020/0374821 A1* | 11/2020 | Wu | ...................... H04W 68/005 |
| 2021/0076275 A1* | 3/2021 | Yiu | .................. H04W 36/0088 |
| 2021/0105719 A1* | 4/2021 | Thangarasa | ....... H04W 52/0229 |
| 2021/0127279 A1* | 4/2021 | Jiang | ..................... H04W 72/12 |
| 2021/0176656 A1* | 6/2021 | Sang | ................... H04W 24/10 |
| 2021/0194563 A1* | 6/2021 | Zhang | .................. H04W 24/10 |
| 2021/0195452 A1* | 6/2021 | Harada | .................. H04W 8/24 |
| 2021/0297884 A1* | 9/2021 | Harada | ............. H04W 72/1263 |
| 2021/0314866 A1* | 10/2021 | Lee | .................. H04W 52/0229 |
| 2022/0007293 A1* | 1/2022 | Kaikkonen | ....... H04W 52/0251 |
| 2022/0038971 A1* | 2/2022 | Liberg | .................... H04W 4/70 |
| 2022/0338124 A1* | 10/2022 | Sabouri-Sichani | ... H04W 24/10 |

FOREIGN PATENT DOCUMENTS

| | | | | |
|---|---|---|---|---|
| CN | 107534865 A | | 1/2018 | |
| CN | 108476128 A | | 8/2018 | |
| CN | 102907133 A | | 1/2023 | |
| EP | 3592039 B1 | * | 9/2021 | .......... H04L 1/0002 |
| KR | 10-2013-0100716 A | | 9/2013 | |
| KR | 101476205 B1 | | 12/2014 | |
| KR | 10-2015-0015457 A | | 2/2015 | |
| KR | 20160024839 A | | 3/2016 | |
| WO | WO 2013-107042 | | 7/2013 | |
| WO | WO-2013107042 A1 | * | 7/2013 | .......... H04W 64/006 |
| WO | WO-2016163854 A1 | * | 10/2016 | .......... H04B 17/318 |
| WO | WO 2017-012540 | | 1/2017 | |
| WO | WO-2017012540 A1 | * | 1/2017 | .......... H04B 17/318 |
| WO | WO-2020013623 A1 | * | 1/2020 | |
| WO | WO-2020027533 A1 | * | 2/2020 | ............. H04L 5/001 |

OTHER PUBLICATIONS

Huawei, HiSilicon, "General considerations on UE power saving in Rel-16," 3GPP TSG RAN WG1 Meeting #94, R1-1809333, Aug. 20, 2018; 5 pages.
Intel Corporation, "Temporary UE capability restriction Stage-2 framework," R2-1811683 ((resubmission of R2-1809800), 3GPP TSG-RAN WG2 Meeting #103, Gothenburg, Sweden, Aug. 20-24, 2018; 4 pages.
3GPP TS 36.331, 3rd Generation Partnership Project; Technical Specification Group Radio Access Network; Evolved Universal Terrestrial Radio Access (E-UTRA); Radio Resource Control (RRC); Protocol specification (Release 15), Sep. 2018; 918 pages.
3GPP TS 38.304, 3rd Generation Partnership Project; Technical Specification Group Radio Access Network; NR; User Equipment (UE) procedures in Idle mode and RRC Inactive state (Release 15), Jun. 2018; 25 pages.
3GPP TS 38.331, 3rd Generation Partnership Project; Technical Specification Group Radio Access Network; NR; Radio Resource Control (RRC) protocol specification (Release 15), Jun. 2018; 303 pages.
Nokia Networks, "Discussion on high speed RRM for connected mode," 3GPP TSG-RAN WG4 Meeting #76bis, Sophia Antipolis, France, Oct. 12-16, 2015, R4-155854; 4 pages.
CATT, "Idle and Connected mode UE mobility based on SS-block measurements," 3GPP TSG RAN WG1#90, Prague, Czechia, Aug. 21-25, 2017, R1-1712360; 5 pages.

* cited by examiner

TECHNIQUES TO REDUCE RADIO RESOURCE MANAGEMENT MEASUREMENTS AND USER EQUIPMENT POWER CONSUMPTION

CROSS REFERENCE TO RELATED APPLICATION

The present application is a National Phase in the United States of PCT Application No. PCT/US2019/053193, filed on Sep. 26, 2019, which claims priority to U.S. Provisional Patent Application No. 62/739,078, filed Sep. 28, 2018, the entire disclosure of PCT/US2019/053193 is incorporated by reference in its entirety.

FIELD

Embodiments of the present invention relate generally to the technical field of wireless communications.

BACKGROUND

In New Radio (NR) wireless communication networks, a user equipment (UE) performs radio resource monitoring (RRM) on measurement objects (e.g., cells). Accordingly, the UE measures feedback information on the measurement objects and transmits the feedback information to the network. The measurements consume significant power of the UE.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
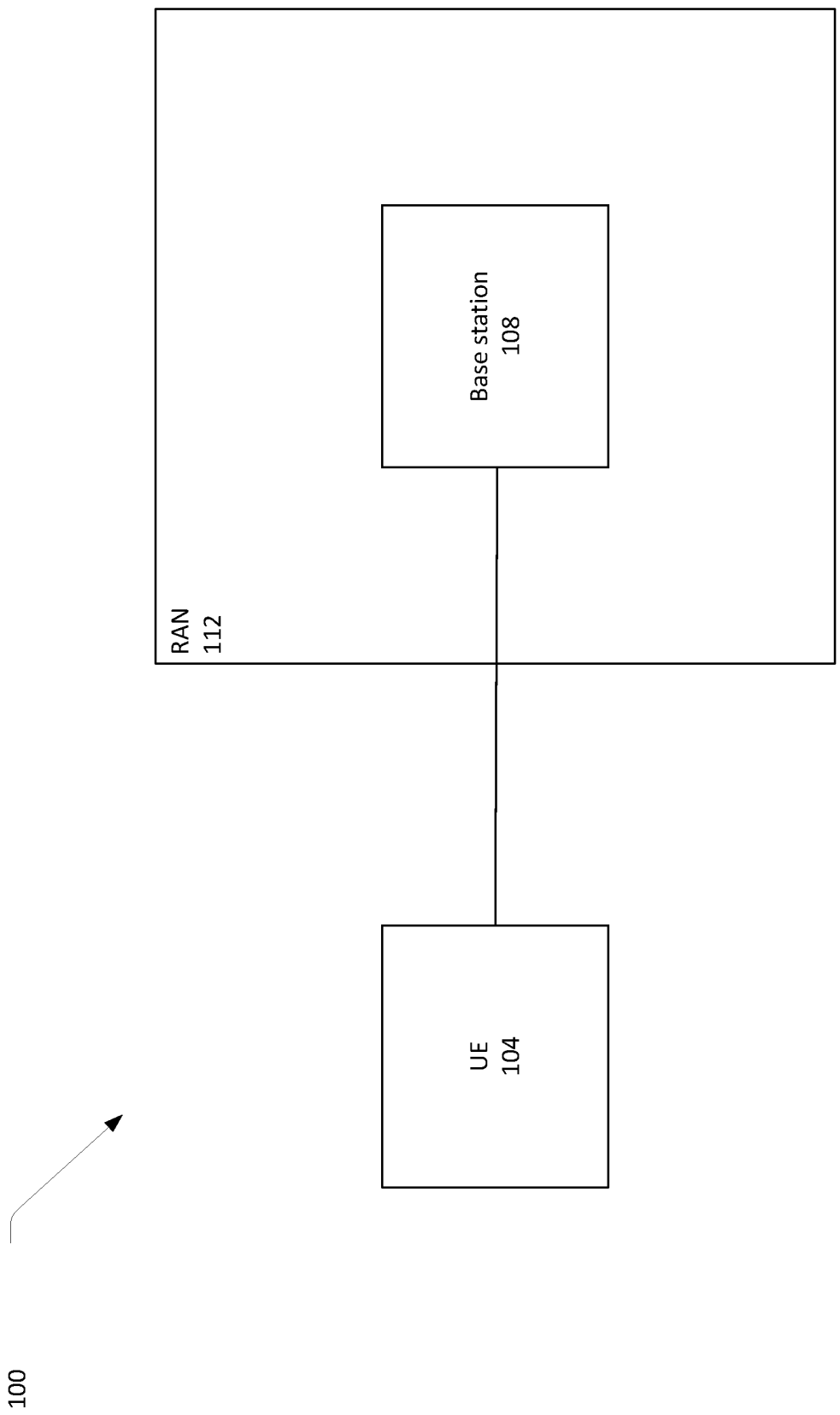
FIG. 1 illustrates a network in accordance with some embodiments.

FIG. 1 illustrates a network 100 in accordance with some embodiments. In general, the components shown in the network 100 may be similar to, and substantially interchangeable with, like-named components in other figures described herein. The network 100 may include a UE 104 to communicate with a base station 108 of a radio access network (RAN) 112 using one or more radio access technologies.

The base station 108 may be referred to as a base station ("BS"), NodeB, evolved NodeB ("eNB"), next generation NodeB ("gNB"), RAN node, Road Side Unit ("RSU"), and so forth, and can comprise a ground station (e.g., a terrestrial access point) or a satellite station providing coverage within a geographic area (for example, a cell). An RSU may refer to any transportation infrastructure entity implemented in or by a gNB/eNB/RAN node or a stationary (or relatively stationary) UE, where an RSU implemented in or by a UE may be referred to as a "UE-type RSU," and an RSU implemented in or by an gNB may be referred to as a "gNB-type RSU."

In some embodiments, the RAN may be a next generation ("NG") radio access network ("RAN"), in which case the base station 108 may be a gNB that communicates with the UE 104 using a new radio ("NR") access technology. Accordingly, the RAN 112 may be a NR wireless cellular network.

The UE 104 may be any mobile or non-mobile computing device that is connectable to one or more cellular networks. For example, the UE 104 may be a smartphone, a laptop computer, a desktop computer, a vehicular computer, a smart sensor, etc. In some embodiments, the UE 104 may be an Internet of Things ("IoT") UE, which may include a network access layer designed for low-power IoT applications utilizing short-lived UE connections. An IoT UE can utilize technologies such as machine-to-machine ("M2M") or machine-type communications ("MTC") for exchanging data with an MTC server or device via a public land mobile network ("PLMN"), Proximity-Based Service ("ProSe") or device-to-device ("D2D") communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

In accordance with some embodiments, the UE 104 can be configured to communicate using Orthogonal Frequency-Division Multiplexing ("OFDM") communication signals with the base station 108 over a multicarrier communication channel in accordance with various communication techniques, such as, but not limited to, an Orthogonal Frequency-Division Multiple Access ("OFDMA") communication technique (for example, for downlink communications) or a Single Carrier Frequency Division Multiple Access ("SC-FDMA") communication technique (for example, for uplink or sidelink communications), although the scope of the embodiments is not limited in this respect. The OFDM signals can comprise a plurality of orthogonal subcarriers.

In some embodiments, a downlink resource grid can be used for downlink transmissions from the base station 108 to the UE 104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical channels that are conveyed using such resource blocks.

In various embodiments, the UE 104 may perform radio resource monitoring (RRM), in which the UE 104 measures feedback information on one or more measurement objects (MO) (e.g., cells). The feedback information may include, for example, a received signal received power (RSRP), a received signal received quality (RSRQ), a signal to interference plus noise ratio (SINR), a channel quality indicator (CQI), and/or another suitable quality metric. The feedback information may be measured on one or more reference signals transmitted by the respective measurement object. For example, in some embodiments, the reference signal may include a synchronization signal (SS)/physical broadcast channel (PBCH) block (SSB) and/or a channel state information (CSI) reference signal (CSI-RS).

The UE 104 may transmit the feedback information to the gNB 108. The gNB 108 may use the feedback information, for example, to determine one or more configuration parameters for the UE 104 to communicate on the RAN 108 and/or whether to handover the UE 104 to a different serving cell.

In various embodiments, the UE 104 may reduce the number of RRM measurements under some conditions, e.g., mobility-related conditions that indicate the UE is stationary or low mobility or very high mobility (which may also be referred to as extreme mobility or train-speed mobility), and/or other conditions, such as MO configurations, cell type (e.g., size of cell, such as macro cell or small cell; high speed dedicated network cell, etc.), frequency of operation, and/or one or more other conditions. For example, the UE 104 may reduce the number of RRM measurements based on one or more conditions that indicate the UE 104 is stationary or low mobility. The RRM measurements may be relatively consistent over time when the UE 104 is stationary or low mobility, and thus more RRM measurements may not be needed. Additionally, or alternatively, the UE 104 may reduce the number of RRM measurements based on one or more conditions that indicate the UE has very high mobility (e.g., a mobility greater than the high mobility state defined under LTE, as discussed further below). When the UE 104 has very high mobility, the network conditions and/or serving cell may change so quickly that the RRM measurements are not representative of current conditions by the time the network is able to consider them.

In some embodiments, the decision to reduce the number of RRM measurements may be made further based on the position of the UE 104 in the serving cell. For example, with other conditions being equal, the UE 104 may determine not to reduce the number of RRM measurements if the UE 104 is near the edge of the serving cell, but may determine to reduce the number of RRM measurements if the UE 104 is near the center of the cell. The position of the UE 104 within the cell may be determined, e.g., based on the measured feedback information (e.g., RSRP, RSRQ, SINR, CQI, etc.) and/or other techniques.

In various embodiments, the UE 104 may reduce the number of RRM measurements by, for example, skipping one or more RRM measurements (e.g., that would otherwise be performed if the conditions for skipping were not met) or extending the time between successive RRM measurements (e.g., by notifying the network that the time between RRM measurements should be extended so that the network will extend the time between transmission of the respective reference signals).

Additionally, or alternatively, in some embodiments the UE 104 may determine not to make measurements on both SSB and CSI-RS even when both SSB and CSI-RS are configured for the UE. For example, the UE 104 may skip one or more measurements on SSB and/or one or more measurements on CSI-RS under certain conditions, such as mobility-related conditions.

Additionally, or alternatively, the UE 104 may restrict usage of the number of antennas, MIMO layers, and/or RF chains under certain conditions.

These and other embodiments are described in further detail below. Various aspects of the described embodiments may be applied in conjunction with one another or independently.

In LTE, there are three mobility states defined for the UE: normal mobility, medium mobility, and high mobility. The UE may determine its mobility is normal mobility state if the number of cell reselections during a time period $T_{CRmax}$ is less than a first threshold $N_{CR\_M}$. The UE may determine that its mobility is medium mobility if the number of cell reselections during the time period $T_{CRmax}$ is greater than or equal to the first threshold $N_{CR\_M}$ but less than a second threshold $N_{CR\_H}$. Additionally, the UE may determine that its mobility is high mobility if the number of cell reselections during the time period $T_{CRmax}$ is greater than the second threshold $N_{CR\_H}$. The time period $T_{CRmax}$ and/or the thresholds $N_{CR\_M}$ and $N_{CR\_H}$ may be predefined and/or signalled by the network. In counting the number of cell reselections, the UE may not consider consecutive reselections where a cell is reselected again right after one reselection for mobility state detection criteria.

In some embodiments, the UE may enter a mobility state based on its determined mobility. If the UE is in High- or Medium-mobility state, the UE shall apply the speed dependent scaling rules as defined in subclause 5.2.4.3.1 in TS 38.304. The cell reselection scaling rules for medium and high mobility states may use T-Reselection values from 0 to 7 sec, and SpeedStateScaleFactors of 0.25, 0.5, 0.75, and 1. The scaling rules may cause the UE to reduce the number of RRM measurements.

In various embodiments provided herein, the UE may reduce the number of RRM measurements when the UE detects that it is stationary or low mobility. Additionally, or alternatively, the UE may reduce the number of RRM measurements when the UE detects that it is very high mobility (e.g., higher mobility than the "high mobility" state defined in LTE). In some embodiments, the UE's handling of the RRM measurements may depend on the RRC connection state of the UE (e.g., RRC_Connected, RRC_IDLE, RRC_INACTIVE). For example, the UE may reduce the number of RRM measurements for stationary/low mobility and/or very high mobility conditions when the UE is in RRC_IDLE or RRC_INACTIVE but not in RRC Connected.

Note that in some embodiments the UE may be not able to skip the RRM measurement on the serving cell before each paging occasion (PO) as the UE might need to do timing/frequency tracking on SSB before each PO. Moreover if the SSB does not happen in the PO, UE may wake up before the PO in order to acquire SSB to do serving cell measurements while in RRC_IDLE/INACTIVE. However the UE may be able to skip inter-freq. or inter-RAT measurements.

Some example options for how the UE may determine whether its mobility is stationary/low and/or very high mobility are described below:

Speed variable approach: Threshold values can be defined for the UE to determine whether it is in stationary mobility state (e.g., no-mobility state or low mobility state). The information of this threshold could be fixed in the specification or the value may be provided by the network (e.g., via broadcast or dedicated signaling) to the UE. For example, if a UE performs certain number of cell reselections (which could be referred e.g. as $N_{CR\_L}$) or less number during certain period of time period (which might be legacy $T_{CRmax}$ or a new values which could be referred e.g. as $T_{CRstationary}$). Accordingly, the UE may determine it is in normal mobility if the number of cell reselections in the time period is greater than $N_{CR\_L}$ and less than $N_{CR\_M}$. For example, the UE may determine its mobility state as follows:

State Detection Criteria Example #1:
Stationary/Low-Mobility State Criteria:
If number of cell reselections during time period $T_{CRmax}$ is less than $N_{CR\_L}$.
Normal-Mobility State Criteria:
If number of cell reselections during time period $T_{CRmax}$, is greater than or equal to $N_{CR\_L}$ but less than $N_{CR\_M}$.
Medium-Mobility State Criteria:
If number of cell reselections during time period $T_{CRmax}$ is greater than or equal to $N_{CR\_M}$ but less than $N_{CR\_H}$.
High-Mobility State Criteria:
If number of cell reselections during time period $T_{CRmax}$ is greater than $N_{CR\_H}$.

In some embodiments, the threshold $N_{CR\_L}$ may be 1. Accordingly, the UE may determine it is stationary or low mobility if the number of cell reselections during the time period is 0 (the UE did not perform any cell reselections during the time period). Therefore, the state criteria may be as follows:

State Detection Criteria Example #2:
No-Mobility State Criteria:
If number of cell reselections during time period $T_{CRmax}$ is equal to 0.
Normal-Mobility State Criteria:
If number of cell reselections during time period $T_{CRmax}$ is greater than 0 but less than $N_{CR\_M}$.
Medium-Mobility State Criteria:
If number of cell reselections during time period $T_{CRmax}$ is greater than or equal to $N_{CR\_M}$ but less than $N_{CR\_H}$.
High-Mobility State Criteria:
If number of cell reselections during time period $T_{CRmax}$ is greater than $N_{CR\_H}$.

The parameters of the time period and the mobility threshold can be configurable by the network (e.g., by broadcast message or RRC dedicated message).

In various embodiments, a similar approach may be used for the UE to determine whether it is in a very high mobility state. For example, threshold values may be defined and/or signaled to the UE (e.g., via broadcast or dedicated signaling) for the UE to determine whether it is in the very high mobility state. For example, the UE may determine that it is in the very high mobility state if the UE determines that a number of cell reselections is equal to or greater than a threshold (which could be referred e.g. as $N_{CR\_V}$) during a certain period of time (which might be legacy $T_{CRmax}$ or a new value which could be referred to, e.g., as $T_{CRVeryHigh}$).

Fixed speed approach: the mobility information (e.g., stationary/low mobility or very high mobility) may be a fixed configuration of the UE which may be known by the network, e.g. via subscription, capabilities (e.g. at AS or NAS level), device type, etc. This information may also be negotiated between UE and network; e.g., network needs to configure or allow the UE to operate as a stationary device or very high speed device all the time or until indicated otherwise. Moreover, in some embodiments, the network may be a driven factor to determine if a UE can or not to operate on very high/extreme speed e.g. the network deployment knows when the UE is in a high speed train.

Deployment related approach: whether a UE is or not stationary may consider the network deployment e.g. for the case of huge cells with multiple transmission-reception points (TRPs).

UE feedback approach: the UE mobility information (e.g., whether the UE is or not stationary/low mobility or very high mobility might be known by the UE via a non-3GPP mechanism e.g. via GPS and/or other location information. This information may provide even more accurate input on other aspects such as mobility speed, location, etc. In some embodiments, the UE may send this mobility information via RRC message to the network. Additionally, or alternatively, the network may pre-configure mobility state of UE to perform the corresponding RRM measurement action as discussed further below.

Rel-15 LTE HSDN (high speed dedicated network) approach: A UE may determine cells under the HSDN conditions based on information provided via the system information (SI) or dedicated message. The UE may determine that its mobility is very high mobility based on being connected to a cell of a HSDN.

Note that HSDN in Rel-15 enabled cell re-selection priority for dedicated network, and different weighting for each cell (depending on cell sizes). The UE counts the cells taken into account this weight. Therefore the main goal in Rel-15 is to improve cell reselection but not the RRM measurements (which is provided by embodiments herein).

In some embodiments, any of the options for how the UE may determine whether its mobility is stationary/low and/or very high mobility described herein may be used in conjunction with one or more other options.

UE Reporting of Mobility Information

Some example embodiments for how the UE may share its mobility information (e.g., to indicate that the UE mobility is stationary/low mobility or very high mobility) are described below. In various embodiments, the UE may report its mobility information via uplink (UL) dedicated signaling e.g. in RRC or medium access control (MAC)

control element (CE). For example, RRCSetupComplete, RRCResumeComplete and/or RRCReestablishmentComplete message may include mobility state information to indicate that the UE is stationary/low mobility or very high mobility. For example, information element mobility State-rxy may indicate the mobility information of the UE according to any of the following examples:

Exemplary #1:
mobility State-rxy ENUMERATED {no, normal, medium, high}
Exemplary #2:
mobility State-rxy ENUMERATED {low, normal, medium, high}
Exemplary #3:
mobilityState-rxy ENUMERATED {normal, medium, high, very high}
Exemplary #4:
mobilityState-rxy ENUMERATED {no/low, normal, medium, high, very high}

The RRC messages described above and/or another message, e.g. UECapabilityInformation may also include whether the UE is stationary kind of UE and/or is capable to determine when the UE is stationary or no-mobile UE and/or a very high mobility UE.

In various embodiments, the information provided by the UE to the network may include one or more of the following:

Mobility state: low, normal, medium, high, very high
Speed: the actual speed of the UE such as 0 km/h, 3 km/h, 30 km/h etc.
Coordinate: the UE may periodically send coordinate system to the network and network may estimate the UE speed/mobility Alternatively, or additionally, the network may perform network based mobility estimation and send the information to the UE.

Example RRM Enhancements for Stationary/Low Mobility UE and/or Very High Mobility UE In various embodiments, a certain number of RRM measurements may be skipped for certain cells and/or frequencies (implicit backlist based on UE's conditions). This may be done without impact to the UE's requirements (e.g., as defined by RAN4). For example, new scaling factors may be defined for UEs that are stationary/low mobility and/or vary high mobility. Example changes to TS 38.304 and TS 38.331 to provide new scaling factors for low mobility UEs are shown below. Corresponding changes may be made to provide new scaling factors for very high mobility UEs.

5.2.4.3.1 Scaling Rules
UE shall apply the following scaling rules:
If neither Medium-nor High-mobility nor Low-mobile state is detected:
no scaling is applied.
If High-mobility state is detected:
Add the sf-High of "Speed dependent ScalingFactor for $Q_{hyst}$" to $Q_{hyst}$ if broadcasted in system information
For NR cells, multiply $Treselection_{NR}$ by the sf-High of "Speed dependent ScalingFactor for $Treselection_{NR}$" if broadcasted in system information
For EUTRA cells, multiply TreselectionEUTRA by the sf-High of "Speed dependent ScalingFactor for TreselectionEUTRA" if broadcasted in system information
If Medium-mobility state is detected:
Add the sf-Medium of "Speed dependent ScalingFactor for $Q_{hyst}$" to $Q_{hyst}$ if broadcasted in system information;
For NR cells, multiply $Treselection_{NR}$ by the sf-Medium of "Speed dependent ScalingFactor for $Treselection_{NR}$" if broadcasted in system information
For EUTRA cells, multiply TreselectionEUTRA by the sf-Medium of "Speed dependent ScalingFactor for TreselectionEUTRA" if broadcasted in system information
If low-mobility state is detected:
Add the sf-Low of "Speed dependent ScalingFactor for $Q_{hyst}$" to $Q_{hyst}$ if broadcasted in system information;
For NR cells, multiply $Treselection_{NR}$ by the sf-Low of "Speed dependent ScalingFactor for $Treselection_{NR}$" if broadcasted in system information
For EUTRA cells, multiply TreselectionEUTRA by the sf-Low of "Speed dependent ScalingFactor for TreselectionEUTRA" if broadcasted in system information Depending on how the skipping of the measurements is defined, different options may be considered. For example:

Option (1) The time required for a UE to acquire a valid measurement is delayed due to the skip within the measurement period.
If the UE needs to take at least "N" samples in order to have a valid measurement, and UE skips some legacy occurrences, the UE will take longer time to get it.
UE's minimum requirements would be impacted (RAN4 impact).
The network could configure the UE with different SMTC (SS/PBCH block measurement timing configuration) periodicity. Where new longer values could also be defined for the SMTC periodicity. Alternatively, with same periods, the UE could be allowed to skip certain values.

Option (2) The time required for a UE to acquire a valid measurement is the same even though UE skips certain samples in the measurement period.
UE's minimum requirements would not be impacted (RAN4 not impact).

Option (3) UE is provided with different SMTC (SS/PBCH block measurement timing configuration) configuration in order to delay the instances when UE takes the samples for its measurements.
UE's minimum requirements would be impacted (RAN4 impact).

Considerations for UEs in RRC CONNECTED

The above embodiments may apply to UEs in RRC_IDLE and/or RRC_INACTIVE. Some or all of the embodiments may also be used for UEs in RRC_CONNECTED. Additional considerations for UEs in RRC_CONNECTED are described below.

In RRC_CONNECTED, there is only one level of search, which would only allow one level of skipping the RRM measurements regardless of the intra/inter-freq/inter-RAT measurements. In some embodiments, different levels may be defined for intra-frequency, inter-frequency and inter-RAT in order to define for RRC_CONNECTED similar thresholds as are also defined for RRC_IDLE and RRC_INACTIVE.

The following new scenarios may be enhanced for a UE in RRC_CONNECTED in order to reduce RRM measurements: scenario A) Stationary UE (which also may be referred as no mobile or low mobile), and scenario B) very high mobile UE (which also may be referred extreme mobility or train-speed mobility).

In some embodiments, a UE in RRC_CONNECTED may determine its mobility based on activation and/or deactivation of measurement objects (MO). Legacy networks can change or remove the measurement configuration for a UE to stop or skip the RRM measurements. However this is not done in a dynamic manner. In various embodiments, unicast signaling (e.g., RRC and/or MAC) may be enabled to allow activation and deactivation of a given MO provided to a UE. Alternatively, new signaling may be defined to disable or deactivate a given MO during certain time upon trigger.

Additionally, or alternatively, the UE may determine its mobility state based on information only available in RRC_CONNECTED e.g. handover information, CSI reporting, etc. UE may request or inform the network of its UE mobility state or network may determine the UE mobility state based on this information provided by the UE or gathered at the network side.

In some embodiments, the UE may autonomously enable and disable one or more MOs based on the mobility state of the UE. This may be a purely UE-based solution in which the UE detects a certain mobility state and determines whether to enable and/or disable one or more MOs based on the configuration of the respective MOs.

Skipping RRM Measurements Based on Cell or Frequency

In various embodiments, the UE may be configured to skip one or more RRM measurements based on the cell type e.g. macro and/or small cell deployments. Moreover, this information may also be tied to the mobility-related scenarios described above. For example, the UE may be configured with a list of cell with cell ID for skipping based on the mobility-related conditions described above. In some embodiments, the decision whether to skip one or more RRM measurements may also take into account the UE's position in the cell (e.g., whether or not the UE is on near the cell edge). These embodiments may apply for UEs in any RRC state.

Similar enhancement may be enabled based on a given frequency of operation.

Skip RRM Based on MO in RRC_CONNECTED

In various embodiments, a UE in RRC_CONNECTED may be configured with different MO based on its mobility state. For example, one or more MOs may be optimized for the different mobility-related scenarios described herein. Moreover, the network may provide multiple MO to a UE and activate/deactivate them based on mobility speed of the UE. Alternatively, the UE may autonomously select one or more MOs to use based on its mobility state and/or other condition that may be defined.

Skip RS

In various embodiments, if a UE is configured with both SSB and CSI-RS, the UE may skip RRM measurements on SSB or CSI-RS. This may apply, for example, to a UE in RRC_CONNECTED.

In Rel-15, a UE could be configured by the network to do measurement in both SSB and CSI-RS, understanding that a UE cannot combine measurements taken from SSB with those taken from CSI-RS. From RAN2 side, MO config could be provided together or separately for SSB and CSI-RS; however the report config would be separately for SSB and CSI-RS.

According to embodiments herein, if the network configures both kind of measurements (via SSB and CSI-RS), some situations may be defined for a UE to skip RRM measurements on one of them:

option 1) it is left up to UE implementation which one to choose.

option 2) UE always skips one of them based on a given condition/situation: option 2.a) skip SSB and do CSI-RS or option 2.b) skip CSI-RS and SSB. This condition/situation may be tied e.g. with the UE's mobility state, UE's location, and/or UE's RSRP/RSRQ, etc.

In addition, the UE may skip one or many of RSRP, RSRQ, SINR for certain mobility state.

Reduce RF Chain Use

In various embodiments, the UE may reduce its usage of an RF chain (e.g., transmit and/or receive chains), a number of antennas or number of MIMO layers based on certain configuration or conditions e.g. based on measurement configuration.

In LTE, perCC-GapIndication was introduced in which UE assistance is provided on the per CC Band indication as part of the UE's capability.

In some embodiments, the UE may change the usage of its RF chain, number of antenna and/or number of MIMO layers based on one or more of the following options:

Option 1) Semi-static: UE provides different UE's capabilities configuration upon network query.

Option 2) Dynamic based on UE trigger or request: UE provides preference to change its usage of the RF chain, number of antenna or MIMO layer. This information may be provided at any given time via a L2 mechanism (e.g. within an RRC message or MAC CE) or via a L1 mechanism (e.g. downlink control information (DCI)). Alternatively, the network may confirm its request or may provide an alternative configuration associated with the same or different kind of information.

Option 3) Dynamic NW trigger/indication: UE changes its configuration based on certain condition/situation, such as, based on a specific mobility state or based on information provided on the traffic status report, or via an indication provided by the network for the UE to change the usage of the MIMO layers or the RF chains or the antennas to use.

Option 4) Mixed approach: UE is configured with multiple configuration that are foreseen desirable for a given UE of the RF chain, number of antenna or MIMO layer and, based on a given situation/condition uses one or another. Those conditions may be specified in the network or may be driven by a network indication (e.g., activation/deactivation of a given configuration).

For example, in some embodiments, a maximum number of MIMO layers may be configured for a bandwidth part (BWP). The UE may limit the number of MIMO layers to this maximum number, and may ignore the cell-specific value provided in the PDSCH ServingCellConfig information element when operating in the BWP. If the maximum number of MIMO layers is not configured for a BWP, then the UE may use the cell-specific value for the BWP.

Figure 2:
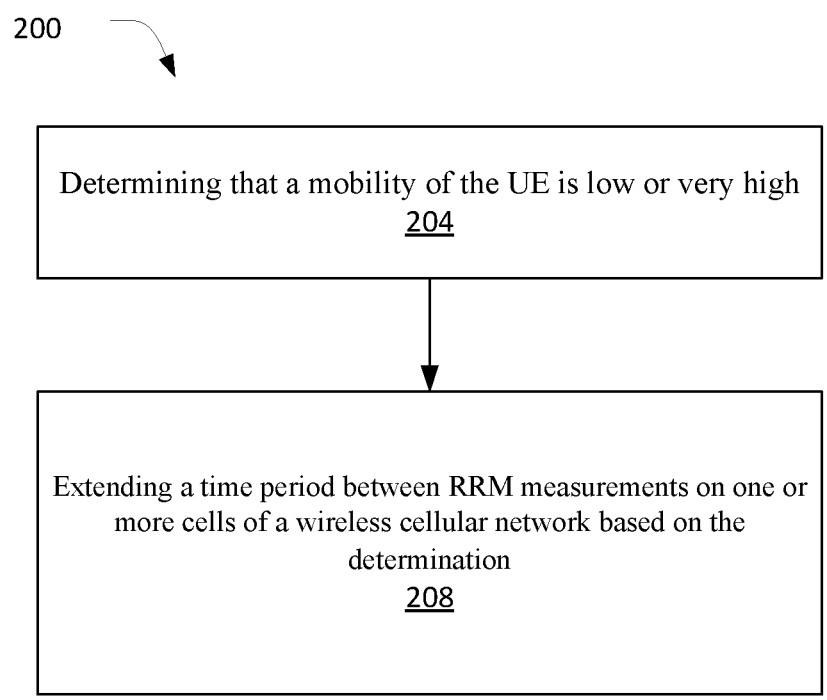
FIG. 2 illustrates an operation flow/algorithmic structure in accordance with some embodiments.

FIG. 2 illustrates an operation flow/algorithmic structure 200 in accordance with some embodiments. The operation flow/algorithmic structure 200 may be performed, in part or in whole, by the UE 104 or components thereof. For example, in some embodiments the operation flow/algorithmic structure 200 may be performed by the baseband circuitry implemented in the UE 104.

The operation flow/algorithmic structure 200 may include, at 204, determining that a mobility of the UE is low or very high. The low (e.g., stationary) or very high mobility may be defined as described herein. For example, the UE may be further configured to determine whether the mobility of the UE is normal, medium, or high, wherein the low mobility is a lower mobility than the normal mobility, and wherein the very high mobility is greater than the high mobility.

The operation flow/algorithmic structure 200 may further include, at 208, extending a time period between RRM measurements on one or more cells of a wireless cellular network based on the determination. For example, the UE may skip one or more RRM measurements (e.g., that would otherwise be performed) if the mobility of the UE is low or very high. In some embodiments, the UE may apply scaling factors as described herein if the mobility of the UE is low or very high.

Figure 3:
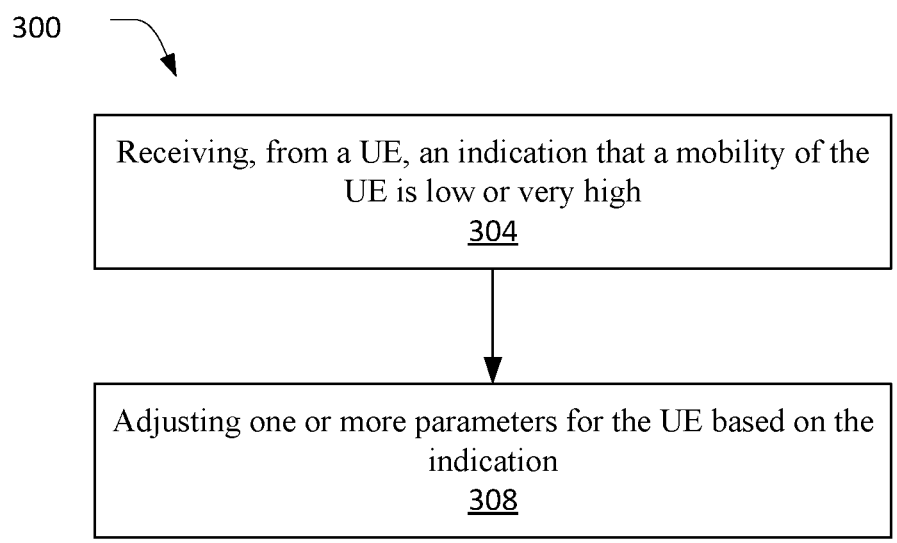
FIG. 3 illustrates an operation flow/algorithmic structure in accordance with some embodiments.

FIG. 3 illustrates an operation flow/algorithmic structure 300 in accordance with some embodiments. The operation flow/algorithmic structure 300 may be performed, in part or in whole, by the base station 108 or components thereof. For example, in some embodiments the operation flow/algorithmic structure 300 may be performed by the baseband circuitry implemented in the base station 108.

The operation flow/algorithmic structure 300 may include, at 304, receiving, from a user equipment (UE), an indication that a mobility of the UE is low or very high. The low (e.g., stationary) or very high mobility may be defined as described herein. For example, the UE may be further configured to determine whether the mobility of the UE is normal, medium, or high, wherein the low mobility is a lower mobility than the normal mobility, and wherein the very high mobility is greater than the high mobility.

The operation flow/algorithmic structure 300 may further include, at 308, adjusting one or more parameters for the UE based on the indication. For example, a time period between RRM measurements made by the UE on one or more cells may be extended.

In some embodiments, the operation flow/algorithmic structure 300 may further include encoding a message, for transmission to a gNB, to indicate the mobility of the UE.

Figure 4:
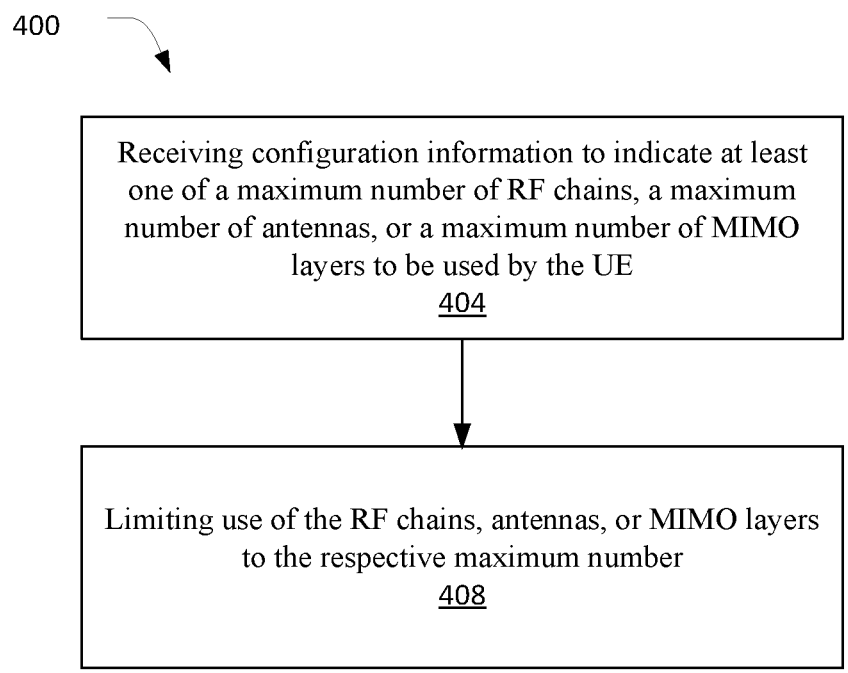
FIG. 4 illustrates an operation flow/algorithmic structure in accordance with some embodiments.

FIG. 4 illustrates an operation flow/algorithmic structure 400 in accordance with some embodiments. The operation flow/algorithmic structure 400 may be performed, in part or in whole, by the UE 104 or components thereof. For example, in some embodiments the operation flow/algorithmic structure 400 may be performed by the baseband circuitry implemented in the UE 104.

The operation flow/algorithmic structure 400 may include, at 404, receiving configuration information to indicate at least one of a maximum number of radio frequency (RF) chains, a maximum number of antennas, or a maximum number of MIMO layers to be used by the UE.

The operation flow/algorithmic structure 400 may further include, at 408, limiting use of the RF chains, antennas, or MIMO layers to the respective maximum number. In some embodiments, the number of RF chains, antennas, and/or MIMO layers may be limited based on one or more conditions, such as a mobility of the UE, network conditions, etc.

Figure 5:
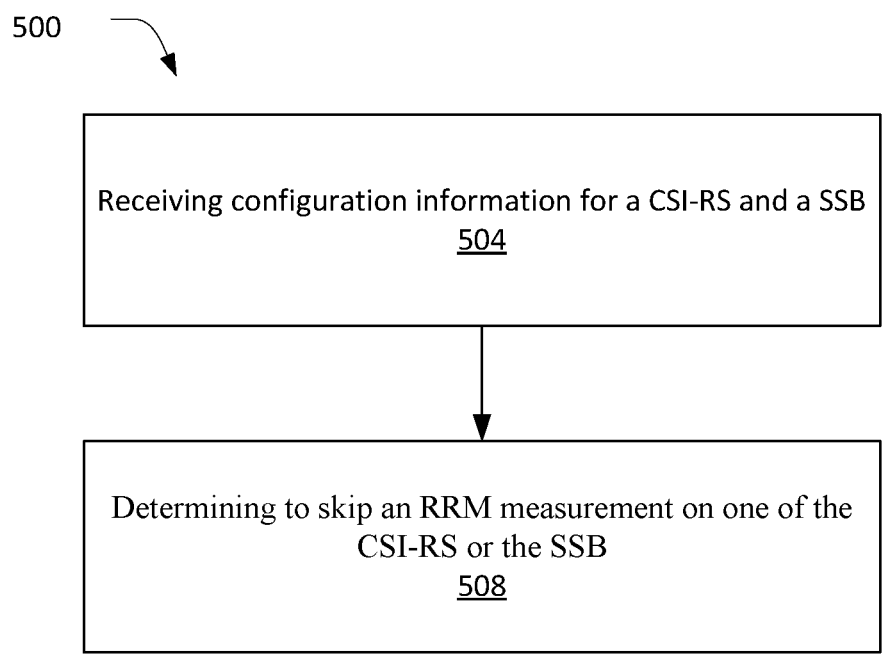
FIG. 5 illustrates an operation flow/algorithmic structure in accordance with some embodiments.

FIG. 5 illustrates another operation flow/algorithmic structure 500 in accordance with some embodiments. The operation flow/algorithmic structure 500 may be performed, in part or in whole, by the UE 104 or components thereof. For example, in some embodiments the operation flow/algorithmic structure 500 may be performed by the baseband circuitry implemented in the UE 104.

The operation flow/algorithmic structure 500 may include, at 504, receiving configuration information for a channel state information reference signal (CSI-RS) and on a synchronization signal (SS)/physical broadcast channel (PBCH) block (SSB).

The operation flow/algorithmic structure 500 may further include, at 508, determining the skip an RRM measurement on one of the CSI-RS or the SSB. The UE may perform an RRM measurement on the other one of the CSI-RS or SSB. In some embodiments, the UE may determine to skip the RRM measurement on one of the CSI-RS or SSB based on one or more circumstances, such as the mobility of the UE and/or network conditions, etc.

Figure 6:
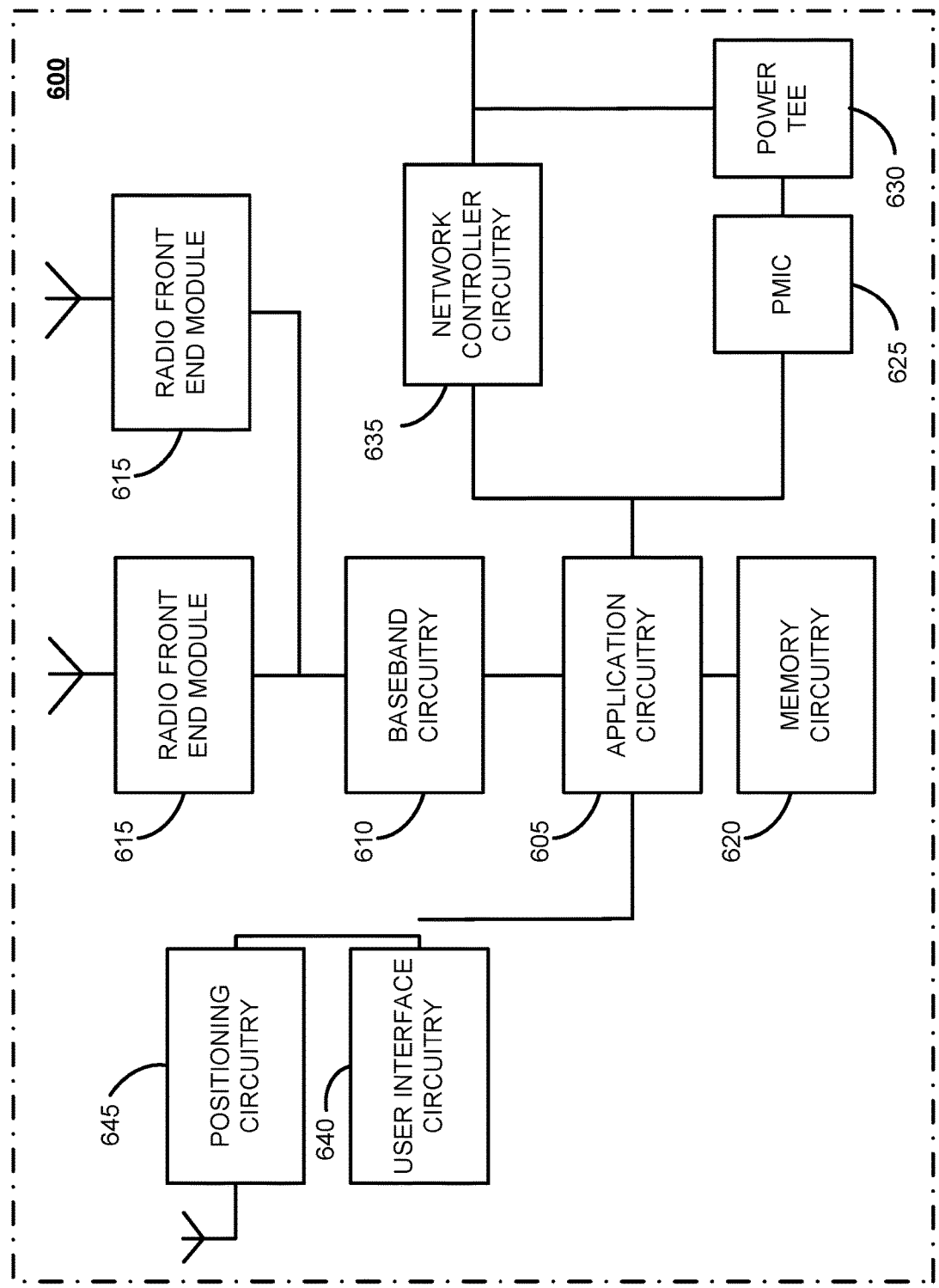
FIG. 6 illustrates an example of infrastructure equipment in accordance with various embodiments.

FIG. 6 illustrates an example of infrastructure equipment 600 in accordance with various embodiments. The infrastructure equipment 600 (or "system 600") may be implemented as a base station, radio head, RAN node, etc., such as base station 108 shown and described previously. The system 600 may include one or more of application circuitry 605, baseband circuitry 610, one or more radio front end modules 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for CRAN, vBBU, or other like implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 605 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 605 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 600 may not utilize application circuitry 605, and instead may include a special-purpose processor/controller to process IP data received from an EPC or 5GC, for example.

Additionally or alternatively, application circuitry 605 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 may comprise various hardware elements (e.g., including hardware devices such as switches, filters, amplifiers, antenna elements, and the like to facilitate OTA communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 645 and/or positioning circuitry implemented by UE 104, or the like) to determine their GNSS position. The GNSS signals may include a pseudo-random code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 645 may include a Micro-Technology for Positioning, Navigation, and Timing (Micro-PNT) integrated circuit (IC) that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 645 may provide data to application circuitry 605 that may include one or more of position data or time data. Application circuitry 605 may use the time data to synchronize operations with other radio base stations (e.g., base station 108 or the like).

The components shown by FIG. 6 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 7:
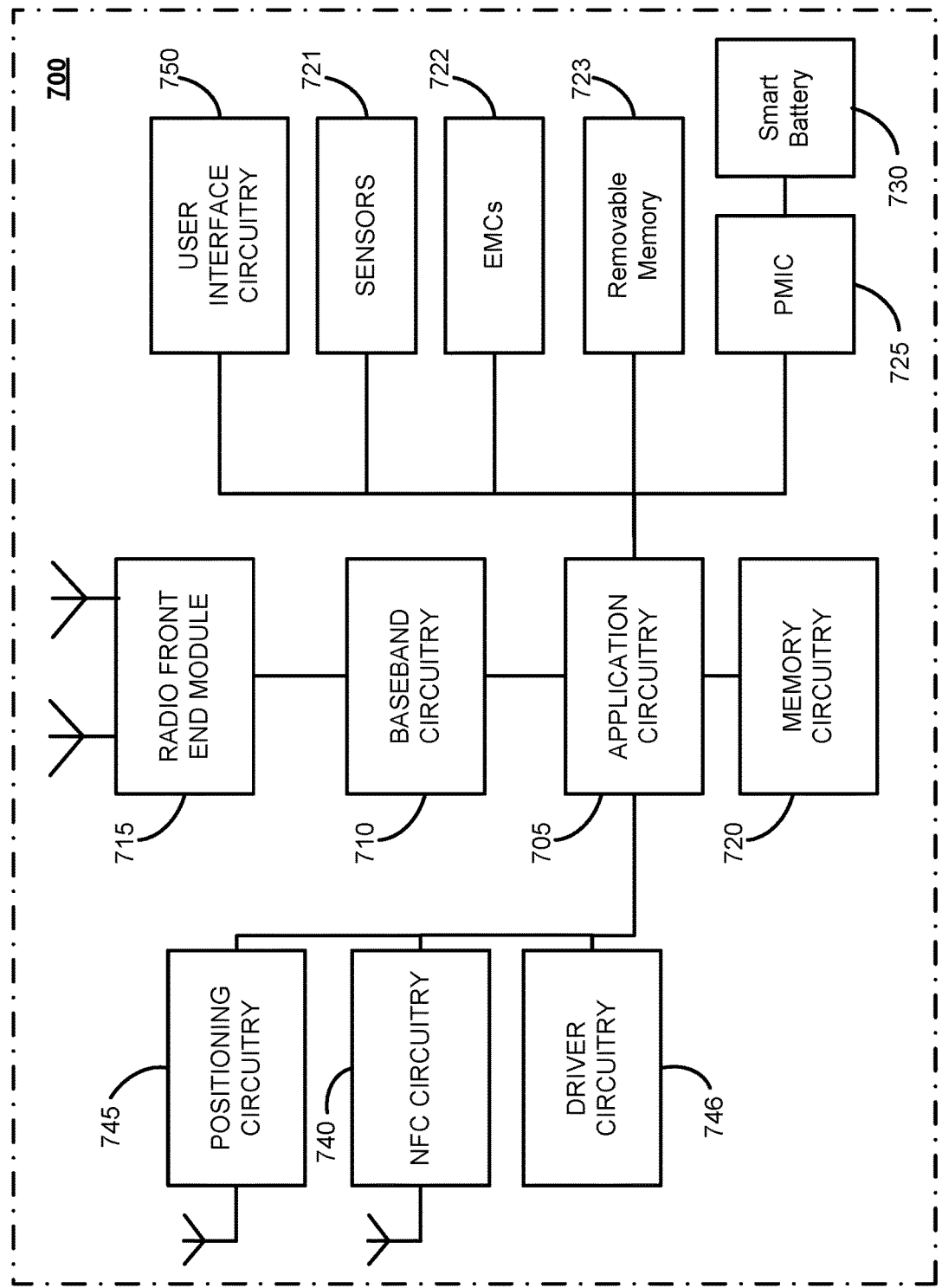
FIG. 7 depicts example components of a computer platform or device in accordance with various embodiments.

FIG. 7 illustrates an example of a platform 700 (or "device 700") in accordance with various embodiments. In embodiments, the computer platform 700 may be suitable for use as UE 104, base station 108, or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

The application circuitry 705 may include circuitry such as, but not limited to, single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input/output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 700. In some embodiments, processors of application circuitry 605/705 may process IP data packets received from an EPC or 5GC.

Application circuitry 705 may be or include a microprocessor, a multi-core processor, a multithreaded processor, an ultra-low voltage processor, an embedded processor, or other known processing element. In one example, the application circuitry 705 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry may include sensors 721, such as accelerometers, level sensors, flow sensors, temperature sensors, pressure sensors, barometric pressure sensors, and the like. The interface circuitry may be used to connect the platform 700 to electro-mechanical components (EMCs) 722, which may allow platform 700 to change its state, position, and/or orientation, or move or control a mechanism or system. The EMCs 722 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 may be configured to operate one or more EMCs 722 based on one or more captured events and/or instructions or control signals received from a service provider and/or various clients.

In some implementations, the interface circuitry may connect the platform 700 with positioning circuitry 745, which may be the same or similar as the positioning circuitry 645 discussed with regard to FIG. 6.

In some implementations, the interface circuitry may connect the platform 700 with Near-Field Communication (NFC) circuitry 740, which may include an NFC controller coupled with an antenna element and a processing device. The NFC circuitry 740 may be configured to read electronic tags and/or connect with another NFC-enabled device.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensors 721 and control and allow access to sensors 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in the UE 104.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC_Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, a power block may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chyrstal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc Although not shown, the components of platform 700 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, a FlexRay system, or any number of other technologies. The bus may be a proprietary bus, for example, used in a SoC based system. Other bus systems may be included, such as an I2C interface, an SPI interface, point-to-point interfaces, and a power bus, among others.

Figure 8:
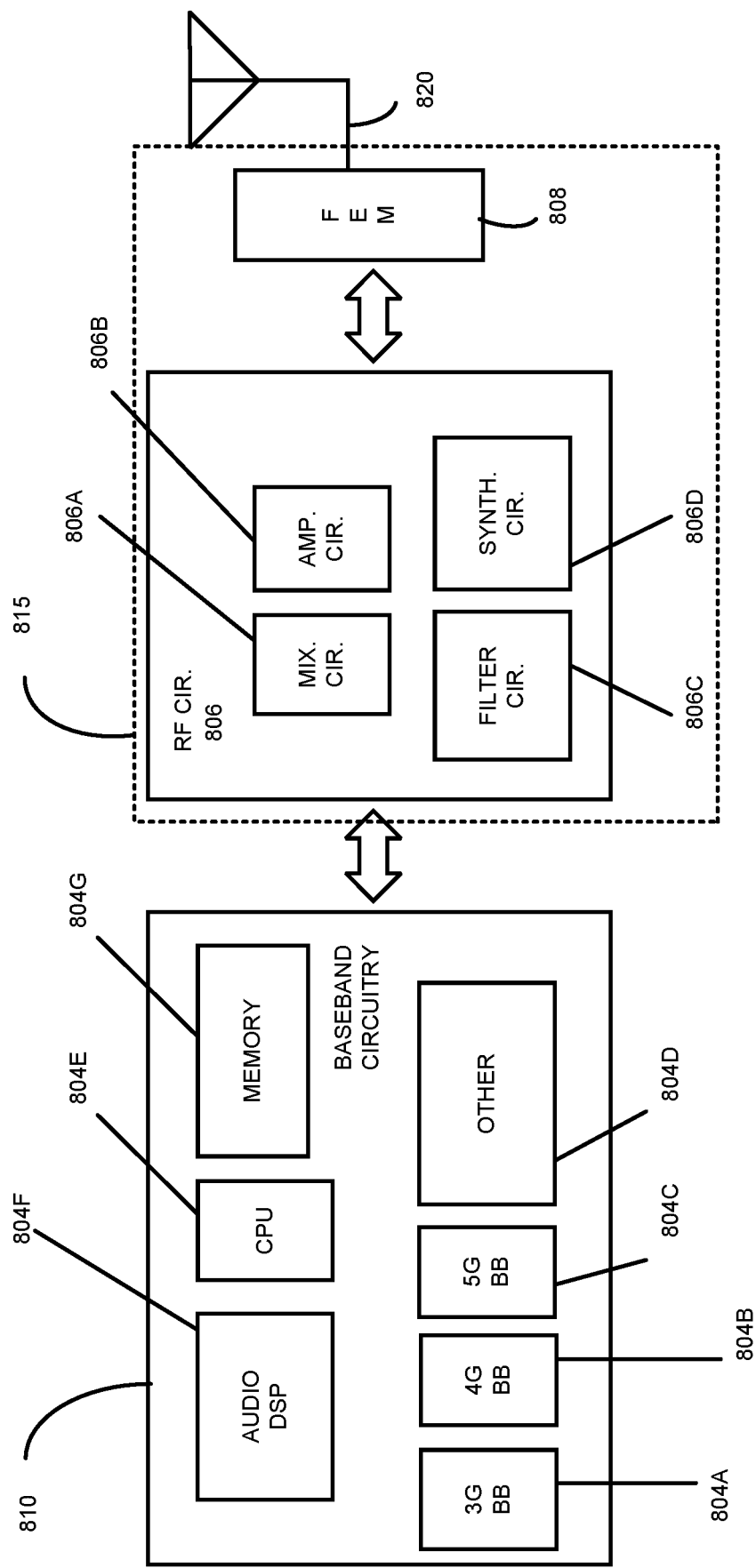
FIG. 8 depicts example components of baseband circuitry and radio frequency end modules in accordance with various embodiments.

FIG. 8 illustrates example components of baseband circuitry 610/710 and radio front end modules (RFEM) 615/715 in accordance with various embodiments. As shown, the RFEMs 615/715 may include Radio Frequency (RF) circuitry 806, front-end module (FEM) circuitry 808, one or more antennas 820 coupled together at least as shown.

The baseband circuitry 610/710 may include circuitry such as, but not limited to, one or more single-core or multi-core processors. The baseband circuitry 610/710 may include one or more baseband processors or control logic to process baseband signals received from a receive signal path of the RF circuitry 806 and to generate baseband signals for a transmit signal path of the RF circuitry 806. Baseband processing circuitry 610/710 may interface with the application circuitry 605/705 for generation and processing of the baseband signals and for controlling operations of the RF circuitry 806. For example, in some embodiments, the baseband circuitry 610/710 may include a third generation (3G) baseband processor 804A, a 4G baseband processor 804B, a 5G baseband processor 804C, or other baseband processor(s) 804D for other existing generations, generations in development or to be developed in the future (e.g., second generation (2G), sixth generation (6G), etc.). The baseband circuitry 610/710 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 610/710 may include Fast-Fourier Transform (FFT), precoding, or constellation mapping/demapping functionality. In some embodiments, encoding/decoding circuitry of the baseband circuitry 610/710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 610/710 may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 610/710 and the application circuitry 605/705 may be implemented together such as, for example, on a system on a chip (SOC).

In some embodiments, the baseband circuitry 610/710 may provide for communication compatible with one or more radio technologies. For example, in some embodiments, the baseband circuitry 610/710 may support communication with an E-UTRAN or other WMAN, a WLAN, a WPAN. Embodiments in which the baseband circuitry 610/710 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 610/710. RF circuitry 806 may also include a transmit signal path, which may include circuitry to up-convert baseband signals provided by the baseband circuitry 610/710 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 610/710 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 610/710 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 610/710 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 610/710 or the application circuitry 605/705 depending on the desired output frequency. In some embodiments, a divider control input (e.g., N) may be determined from a look-up table based on a channel indicated by the application circuitry 605/705.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from one or more antennas 820, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of the one or more antennas 820. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 820).

Processors of the application circuitry 605/705 and processors of the baseband circuitry 610/710 may be used to execute elements of one or more instances of a protocol stack. For example, processors of the baseband circuitry 610/710, alone or in combination, may be used execute Layer 3, Layer 2, or Layer 1 functionality, while processors of the application circuitry 605/705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail herein.

Figure 9:
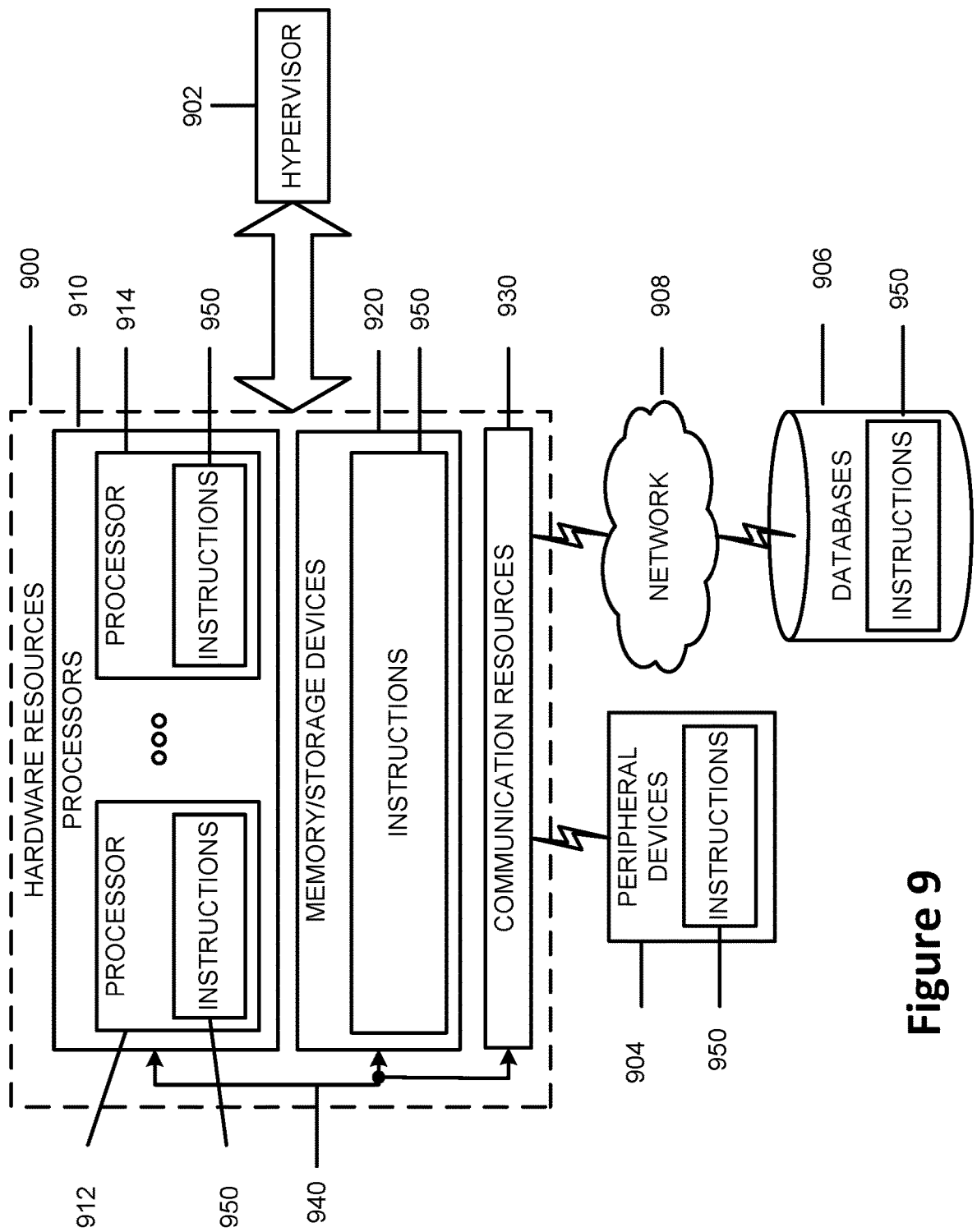
FIG. 9 is a block diagram illustrating components, according to some example embodiments, able to read instructions from a machine-readable or computer-readable medium (for example, a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 902 may be executed to provide an execution environment for one or more network slices/sub-slices to utilize the hardware resources 900. A "virtualized resource" may refer to compute, storage, and/or network resources provided by virtualization infrastructure to an application, device, system, etc.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 914.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 1030 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Some non-limiting Examples of various embodiments are provided below.

Example 1 is one or more computer-readable media (CRM) having instructions, stored thereon, that when executed by one or more processors cause a user equipment (UE) to: determine that a mobility of the UE is low or very high; and extend a time period between radio resource management (RRM) measurements on one or more cells of a wireless cellular network based on the determination.

Example 2 is the one or more CRM of Example 1 or another example herein, wherein the instructions are further to cause the UE to determine whether the mobility is normal, medium, or high, wherein the low mobility is a lower mobility than the normal mobility and the very high mobility is greater than the high mobility.

Example 3 is the one or more CRM of Example 1-2 or another example herein, wherein the determination is a determination that the mobility of the UE is low.

Example 4 is the one or more CRM of Example 3 or another example herein, wherein the UE is to determine that the mobility of the UE is low if a number of cell reselections during a defined time period is less than a threshold.

Example 5 is the one or more CRM of Example 3 or another example herein, wherein the UE is to determine that the mobility of the UE is low if a number of cell reselections during a defined time period is 0.

Example 6 is the one or more CRM of Example 1-2 or another example herein, wherein the determination is a determination that the mobility of the UE is very high.

Example 7 is the one or more CRM of Example 1-6 or another example herein, wherein the mobility of the UE is a fixed configuration of the UE.

Example 8 is the one or more CRM of Example 1-7 or another example herein, wherein the UE is to extend the time period between RRM measurements based on the determination if the UE is in an RRC_IDLE or an RRC_INACTIVE state.

Example 9 is the one or more CRM of Example 1-8 or another example herein, wherein the instructions, when executed, further cause the UE to encode a message, for transmission to a next generation node B (gNB) of the wireless cellular network, to indicate the mobility of the UE.

Example 10 the one or more CRM of Example 1-9 or another example herein, wherein the UE is to extend the time period between RRM measurements by skipping one or more RRM measurements.

Example 11 is the one or more CRM of Example 1-10 or another example herein, wherein the UE is to extend the time period between RRM measurements for a subset of cells, measurement objects, or frequencies on which the UE operates.

Example 12 is the one or more CRM of Example 1-11 or another example herein, wherein the instructions, when executed, are further to cause the UE to:
receive configuration information for a channel state information reference signal (CSI-RS) and a synchronization signal (SS)/physical broadcast channel (PBCH) block (SSB); and
determine to skip an RRM measurement on the CSI-RS or the SSB.

Example 13 is the one or more CRM of any of Examples 1-12 or another example herein, wherein the UE is to extend the time period between RRM measurements further based on a received signal received power (RSRP), received signal received quality (RSRQ) or signal to interference plus noise (SINR) for a cell associated with the RRM measurements.

Example 14 is one or more computer-readable media (CRM) having instructions, stored thereon, that when executed by one or more processors cause a next generation Node B (gNB) of a wireless cellular network to: receive, from a user equipment (UE), an indication that a mobility of the UE is low or very high, wherein the UE is further configured to determine whether the mobility of the UE is normal, medium, or high, wherein the low mobility is a lower mobility than the normal mobility, and wherein the very high mobility is greater than the high mobility; and adjust one or more parameters for the UE based on the indication.

Example 15 is the one or more CRM of Example 14 or another example herein, wherein the adjustment of one or more parameters includes an extension of a time period between radio resource management (RRM) measurements on one or more cells of the wireless cellular network.

Example 16 is the one or more CRM of Example 14-15 or another example herein, wherein the indication is an indication that the mobility of the UE is low.

Example 17 is the one or more CRM of Example 14-15 or another example herein, wherein the indication is an indication that the mobility of the UE is very high.

Example 18 is the one or more CRM of Example 14-17 or another example herein, wherein the mobility of the UE is a fixed configuration of the UE.

Example 19 is the one or more CRM of Example 14-18 or another example herein, wherein the UE is in an RRC_IDLE, an RRC_INACTIVE, or an RRC_CONNECTED state with the gNB.

Example 20 is one or more computer-readable media (CRM) having instructions, stored thereon, that when executed by one or more processors cause a user equipment (UE) to: receive configuration information to indicate at least one of a maximum number of radio frequency (RF) chains, a maximum number of antennas, or a maximum number of MIMO layers to be used by the UE; and limiting use of the RF chains, antennas or MIMO layers to the respective maximum number.

Example 21 is the one or more CRM of Example 20 or another example herein, wherein the UE is to limit the use of the RF chains, antennas, or MIMO layers to the respective maximum network under certain network conditions.

Example 22 is the one or more CRM of Example 20-21 or another example herein, wherein the configuration information is to indicate the maximum number of MIMO layers to be used by the UE.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory computer-readable media (CRM) having instructions stored thereon, the instructions, when executed by one or more processors, cause a user equipment (UE) to:
    determine a position of the UE within one or more cells of a wireless cellular network;
    determine that a mobility of the UE is a low mobility or a very high mobility; and
    skip one or more radio resource management (RRM) measurements on the one or more cells to extend a time period between successive RRM measurements on the one or more cells based on the mobility of the UE and the position of the UE.

2. The one or more non-transitory CRM of claim 1, wherein the instructions, when executed by the one or more processors, further cause the UE to determine whether the mobility is a normal mobility, a medium mobility, or a high mobility,
    wherein the low mobility is less than the normal mobility, and
    wherein the very high mobility is greater than the high mobility.

3. The one or more non-transitory CRM of claim 1, wherein the instructions, when executed by the one or more processors, cause the UE to determine that the mobility of the UE is the low mobility when a number of cell reselections during a defined time period is less than a threshold.

4. The one or more non-transitory CRM of claim 1, wherein the instructions, when executed by the one or more processors, cause the UE to determine that the mobility of the UE is the low mobility when the number of cell reselections during the defined time period is 0.

5. The one or more non-transitory CRM of claim 1, wherein the mobility of the UE is a fixed configuration of the UE.

6. The one or more non-transitory CRM of claim 1, wherein the instructions, when executed by the one or more processors, cause the UE to skip the one or more RRM measurements based on a determination of whether the UE is operating in an RRC IDLE or an RRC INACTIVE state.

7. The one or more non-transitory CRM of claim 1, wherein the instructions, when executed by the one or more processors, further cause the UE to encode a message for transmission to a base station (BS) of the wireless cellular network to indicate the mobility of the UE.

8. The one or more non-transitory CRM of claim 1, wherein the instructions, when executed by the one or more processors, cause the UE to skip the one or more RRM measurements to extend the time period between the RRM measurements for a subset of cells, measurement objects, or frequencies on which the UE operates.

9. The one or more non-transitory CRM of claim 1, wherein the instructions, when executed by the one or more processors, further cause the UE to:
    receive configuration information for a channel state information reference signal (CSI RS) and a synchronization signal (SS)/physical broadcast channel (PBCH) block (SSB); and
    determine to skip the one or more RRM measurements on the CSI-RS or the SSB.

10. The one or more non-transitory CRM of claim 1, wherein the instructions, when executed by the one or more processors, further cause the UE to skip the one or more RRM measurements based on a received signal received power (RSRP), a received signal received quality (RSRQ), or a signal to interference plus noise ratio (SINR) for a cell associated with the RRM measurements.

11. One or more non-transitory computer-readable media (CRM) having instructions stored thereon, the instructions, when executed by one or more processors, cause a base station (BS) of a wireless cellular network to: receive an indication of a position of a user equipment (UE) within one or more cells of the wireless cellular network; receive an indication that a mobility of the UE is a low mobility or a very high mobility, wherein the low mobility is less than a normal mobility, and wherein the very high mobility is greater than the normal mobility; and adjust one or more parameters for the UE to configure the UE to skip one or more radio resource management (RRM) measurements on the one or more cells to extend a time period between successive RRM measurements on the one or more cells based on the mobility of the UE and the position of the UE.

12. The one or more non-transitory CRM of claim 11, wherein the mobility of the UE is a fixed configuration of the UE.

13. The one or more non-transitory CRM of claim 11, wherein the UE is in an RRC IDLE, an RRC INACTIVE, or an RRC CONNECTED state with the BS.

14. The one or more non-transitory CRM of claim 11, wherein the instructions, when executed by the one or more processors, cause the B S to receive the indication that the mobility of the UE is a very low mobility or a high mobility,
    wherein the very low mobility is a lower mobility less than the low mobility, and
    wherein the very high mobility is greater than the high mobility.

15. A method for operating a user equipment (UE), the method comprising:
    determining, by the UE, a position of the UE within one or more cells of a wireless cellular network;
    determining, by the UE, that a mobility of the UE is a low mobility or a very high mobility; and skipping, by the UE, one or more radio resource management (RRM) measurements on the one or more cells to extend a time period between successive RRM measurements on one or more cells of the wireless cellular network based the determination of the mobility of the UE and the position of the UE.

16. The method of claim 15, wherein the skipping comprises skipping the one or more RRM measurements based on a received signal received power (RSRP), a received signal received quality (RSRQ), or a signal to interference plus noise ratio (SINR) for a cell associated with the RRM measurements.

17. The one or more non-transitory CRM of claim 1, wherein the instructions, when executed by the one or more processors, further cause the UE to skip the one or more RRM measurements based further on a cell type.

18. The one or more non-transitory CRM of claim 11, wherein the instructions, when executed by one or more processors, cause the BS to adjust the one or more parameters for the UE to configure the UE to skip the one or more RRM measurements based further on a cell type.

19. The method of claim 15, wherein the skipping comprises skipping the one or more RRM measurements based further on a cell type.

* * * * *